United States Patent
Gong

(10) Patent No.: US 10,359,600 B2
(45) Date of Patent: Jul. 23, 2019

(54) OPTICAL SYSTEM FOR ADJUSTING AND COMPENSATING BACK FOCUS THROUGH MULTI-OPTICAL-PATH COMBINATION

(71) Applicant: UNION OPTECH CO., LTD., Zhongshan, Guangdong (CN)

(72) Inventor: Junqiang Gong, Guangdong (CN)

(73) Assignee: UNION OPTECH CO., LTD., Zhongshan (CN)

(*) Notice: Subject to any disclaimer, the term of this patent is extended or adjusted under 35 U.S.C. 154(b) by 0 days.

(21) Appl. No.: 15/863,929

(22) Filed: Jan. 7, 2018

(65) Prior Publication Data

US 2018/0314031 A1 Nov. 1, 2018

(30) Foreign Application Priority Data

Apr. 28, 2017 (CN) .......................... 2017 1 0290998

(51) Int. Cl.
*G02B 7/02* (2006.01)
*G02B 27/10* (2006.01)
*G02B 7/04* (2006.01)
*G02B 7/00* (2006.01)

(52) U.S. Cl.
CPC ............. *G02B 7/023* (2013.01); *G02B 7/006* (2013.01); *G02B 7/04* (2013.01); *G02B 27/10* (2013.01)

(58) Field of Classification Search
CPC ... G02B 7/00; G02B 7/02; G02B 7/04; G02B 7/006; G02B 7/021; G02B 7/022; G02B 7/282; G02B 21/18; G02B 21/20; G02B 23/00; G02B 23/02; G02B 23/16; G02B 23/18

See application file for complete search history.

(56) References Cited

U.S. PATENT DOCUMENTS

| | | | | |
|---|---|---|---|---|
| 4,457,619 A | * | 7/1984 | Takahashi | G03G 15/041 355/55 |
| 5,758,206 A | * | 5/1998 | Imaoka | G02B 7/10 348/347 |
| 2007/0295893 A1 | * | 12/2007 | Olsen | H01L 27/14634 250/226 |
| 2009/0116127 A1 | * | 5/2009 | Liang | G02B 13/06 359/749 |
| 2010/0232161 A1 | * | 9/2010 | Aschwanden | G02B 3/14 362/278 |
| 2017/0176712 A1 | * | 6/2017 | Shibasaki | G02B 7/10 |

* cited by examiner

*Primary Examiner* — Sultan Chowdhury

(57) ABSTRACT

The present invention discloses an optical system for adjusting and compensating a back focus through a multi-optical-path combination. The optical system includes a lens barrel. The lens barrel is provided with a lens head holder body. A light splitting component used for splitting a light beam into a plurality of light beams is arranged in the lens head holder body. The present invention may perform matching and adjustment according to a requirement of the optical system in each rate state, so that a plurality of paths of light shares a focus.

8 Claims, 6 Drawing Sheets

OPTICAL SYSTEM FOR ADJUSTING AND COMPENSATING BACK FOCUS THROUGH MULTI-OPTICAL-PATH COMBINATION

CROSS REFERENCE TO RELATED APPLICATIONS

The present application claims the benefit of Chinese Patent Application No. 201710290998.7 filed on Apr. 28, 2017. All the above are hereby incorporated by reference.

BACKGROUND

Technical Field

The present invention relates to an optical lens, and in particular, to an optical system for adjusting and compensating a back focus through a multi-optical-path combination.

Related Art

Each group is one of elements that form a zoom lens. A working environment of a lens has features such as diversified and unfixed. In a current market, an independent horizontal optical path has been implemented. A switching of an independent horizontal optical path of an ICR (infrared cut-off filter) has been very mature and may meet a requirement that multi-optical-path imaging is simultaneously achieved. A plurality of chips can be assembled on the same lens to meet the requirement that the multi-optical-path imaging is simultaneously achieved. A light enters into an optical system of the lens. Before the light enters into an imaging plane, a light splitting component is used to feedback different spectral lights to different included angle directions, and then further enters into chip imaging. The ICR cooperates with the light splitting component in arrangement of a light splitting included angle, so as to meet the requirement that the multi-optical-path imaging is simultaneously achieved. But a problem that two optical paths share a focus on the imaging plane cannot be resolved.

The present invention is generated based on the above deficiencies.

SUMMARY

The technical problem to be resolved in the present invention is to provide an optical system for adjusting and compensating a back focus through a multi-optical-path combination.

Compared with the prior art, the optical system for adjusting and compensating a back focus through a multi-optical-path combination in the present invention achieves the following effects:

1. According to the present invention, after being emitted, lights that form an included angle can respectively correspond to a plurality of light filter combinations. Each light filter can be movably adjusted. Ray adjustment performed each time corresponds to a light filter. Since the thickness of the light filter and a location of the back focus are in a relation of a ratio of 1:3, the light filters can form a plurality of combinations and the back focus of each combination is different. Therefore, matching and adjustment may be made according to a requirement of the optical system in each rate state, so that a plurality of paths of light share a focus. A structure is simple and adjustment is convenient.

2. The present invention resolves a problem that imaging of optical paths perpendicular to each other is simultaneously achieved. Various complex monitoring environments can be more precisely controlled, so that the conventional multi-optical-path imaging quality is improved in leaps and bounds to implement resource integration, and the lens can be fully utilized and applied to lens products such as security and digital products requiring a plurality of groups to form the optical system.

3. The present invention reduces the difficulty of an optical design. Even if two paths of light do not share a focus in optics, the present invention can perform a function of adjusting and compensating, so that the light shares a focus. The present invention uses a step motor and a PI (Proportion Integration) to control a stop position of the light filters, so that combination and matching of various light filters can be more accurately controlled. Assuming that X light filters are designed on each optical path, there are $X^2$ matching and combinations. A combination of sharing a focus is adjusted at an original normal temperature. When confronting a severe environment such as a high or low temperature, a control program may automatically recognize a state of the combination of the light filters and perform a control switching, so as to recover an effect of sharing a focus at the normal temperature and improve the imaging quality.

BRIEF DESCRIPTION OF THE DRAWINGS

Specific implementation manners of the present invention are further described in detail hereinafter with reference to the accompanying drawings.

Description of the accompanying drawings: 1. a lens barrel; 2. a lens head holder body; 21. a first guide rail; 22. a second guide rail; 23. a third guide rail; 24. a fourth guide rail; 25. a horizontal end face; 251. a horizontal light outlet aperture; 26. a vertical end face; 27. a horizontal cover plate; 271. a horizontal cover plate aperture; 28. a vertical light outlet aperture; 29. a vertical cover plate; 291. a vertical cover plate aperture; 3. a horizontal light filter group; 31. a first rack; 30. horizontal light filters; 4. a horizontal driving mechanism; 41. a horizontal driving motor; 42. a first deceleration gear group; 43. a first driving tooth; 44. a first first-order driven large tooth; 45. a first first-order driven small tooth; 46. a first second-order driven large tooth; 47. a first second-order driven small tooth; 5. a vertical light filter group; 50. vertical light filters; 51. a second rack; 6. a vertical driving mechanism; 61. a vertical driving motor; 62. a second deceleration gear group; 63. a second driving tooth; 64. a second first-order driven large tooth; 65. a second first-order driven small tooth; 66. a second second-order driven large tooth; and 67. a second second-order driven small tooth.

DETAILED DESCRIPTION

The technical solutions of embodiments of the present invention are clearly and completely described in the following with reference to the accompanying drawings of the embodiments of the present invention.

Figure 1:
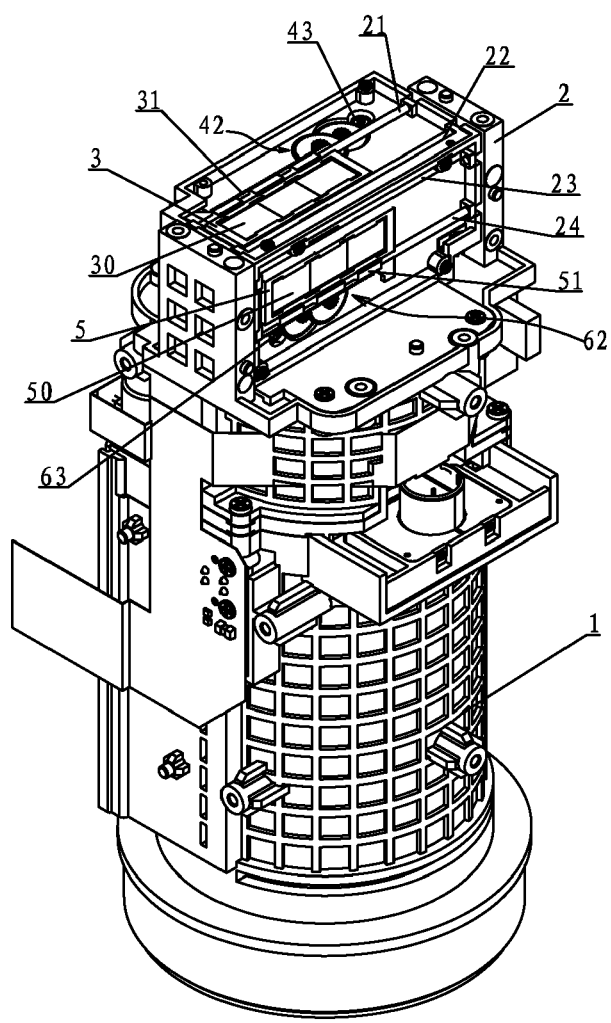
FIG. 1 is a three-dimensional view according to the present invention.
Figure 2:
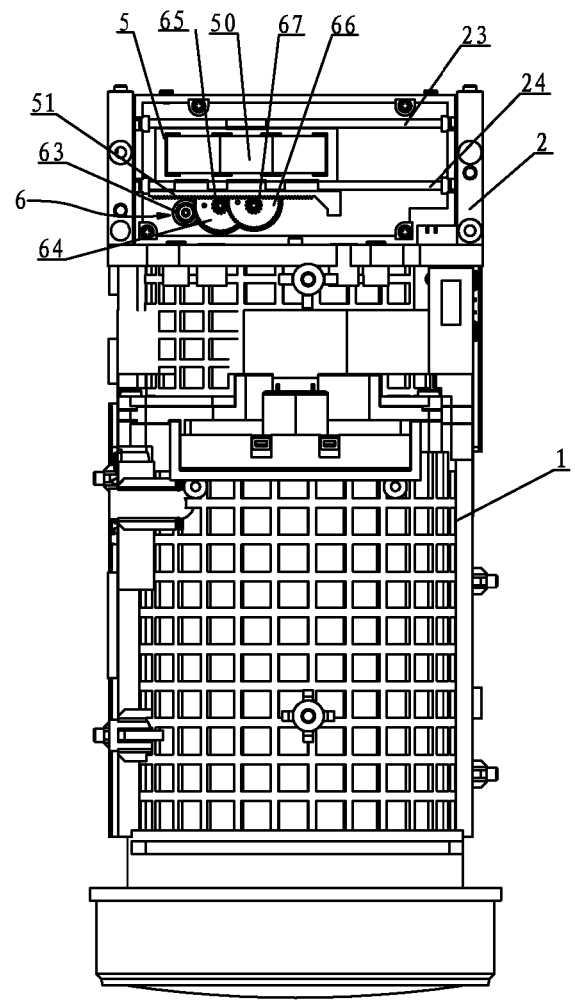
FIG. 2 is a right view according to the present invention.
Figure 3:
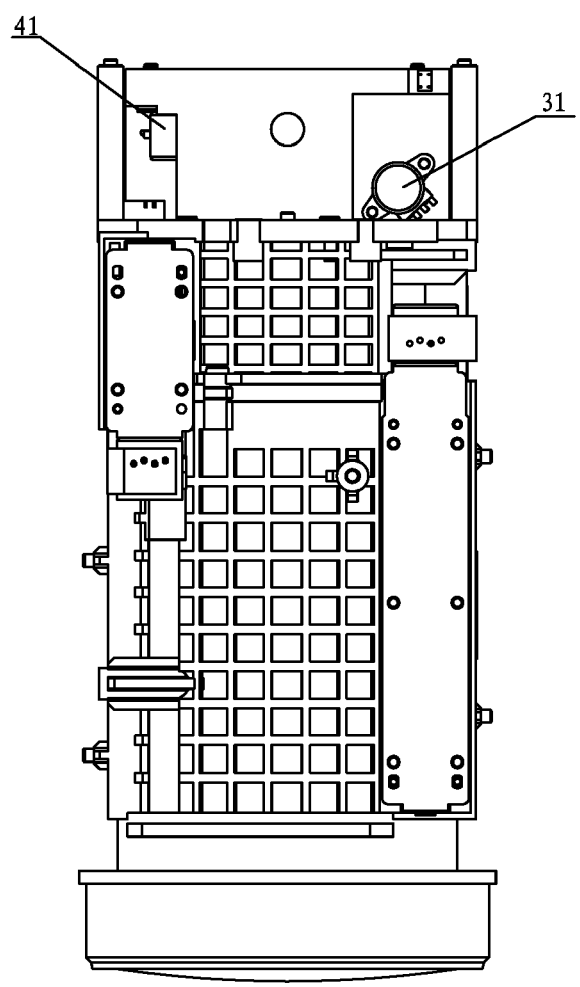
FIG. 3 is a left view according to the present invention.
Figure 4:
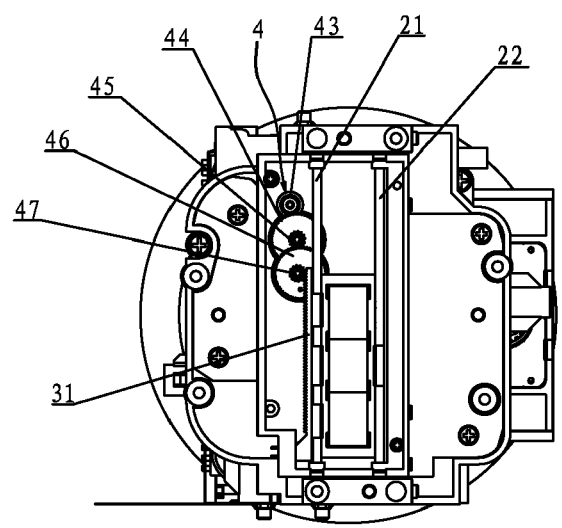
FIG. 4 is a top view according to the present invention.
Figure 5:
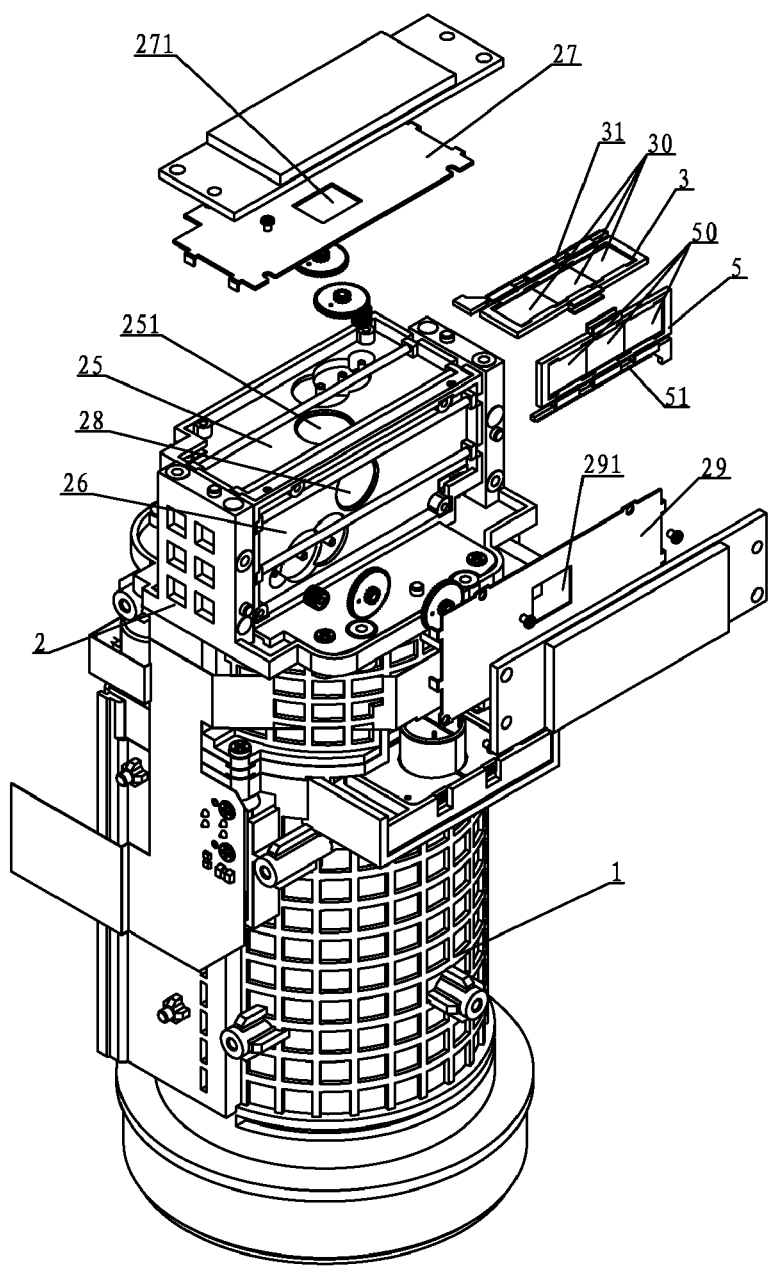
FIG. 5 is an exploded diagram according to the present invention.
Figure 6:
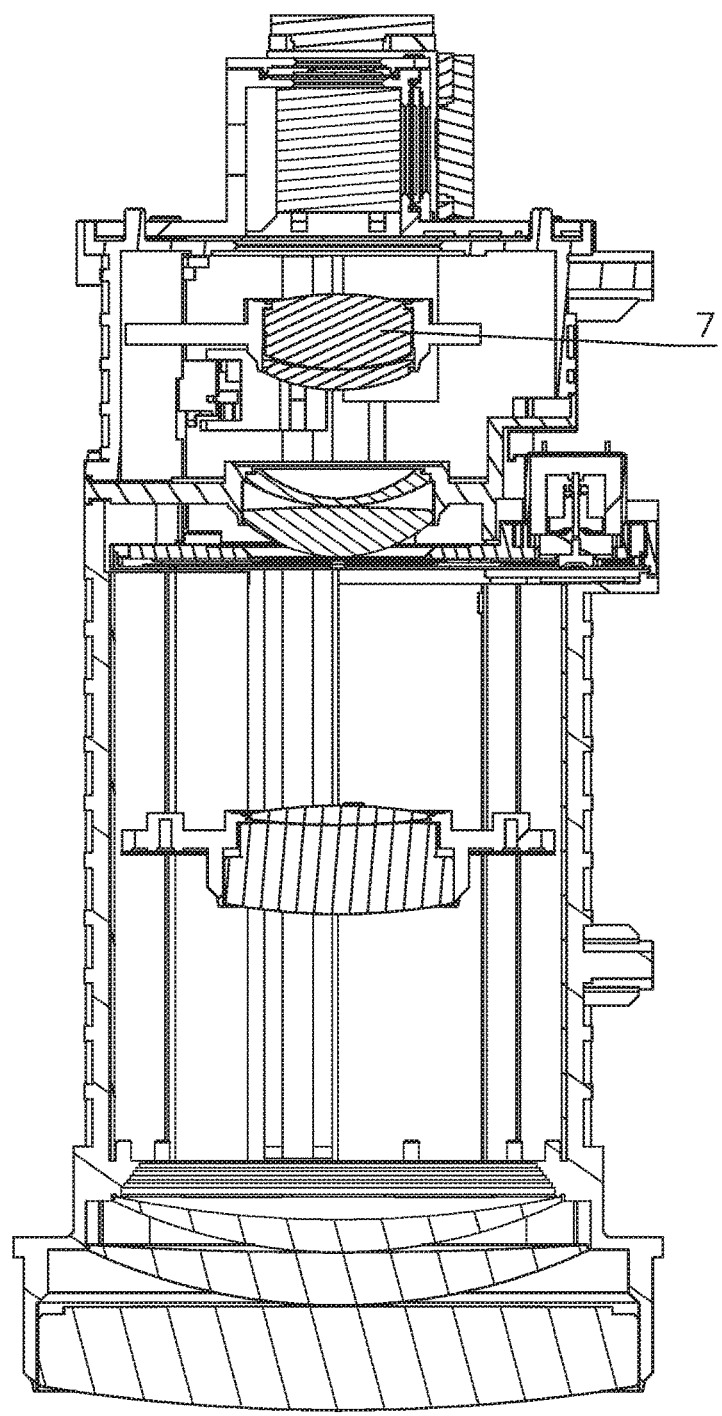
FIG. 6 shows the light splitting component according to an embodiment of the present invention.

As shown in FIG. 1 to FIG. 6, an optical system for adjusting and compensating a back focus through a multi-optical-path combination includes a lens barrel 1, where the lens barrel 1 is provided with a lens head holder body 2. A light splitting component 7 (e.g., prism) used for splitting a light beam into a plurality of light beams is arranged in the lens head holder body 2. The lens head holder body 2 is provided with a plurality of light filter groups used for allowing the plurality of light beams emitted by the light splitting component to pass through and a driving mechanism capable of driving the light filter groups to reciprocate.

As shown in FIG. 1 to FIG. 5, in this embodiment, the light filter groups include a horizontal light filter group 3 for a horizontal light beam to pass through and a vertical light filter group 5 for a vertical light beam to pass through. The horizontal light beam refers to a light beam in parallel to an axial direction of the lens barrel. The vertical light beam refers to a light beam perpendicular to the horizontal light beam. The driving mechanism includes a horizontal driving mechanism 4 that can drive the horizontal light filter group 3 to reciprocate and a vertical driving mechanism 6 that can drive the vertical light filter group 5 to reciprocate. The horizontal light filter group 3 is composed of at least two horizontal light filters 30 with different thicknesses. The vertical light filter group 5 is composed of at least two vertical light filters 50 with different thicknesses.

The horizontal filter group 3 has different thicknesses. When the horizontal driving mechanism 4 drives the horizontal light filter group 3 to move by a displacement, the horizontal light beam correspondingly passes through a horizontal light filter 30 and the horizontal light beam only passes through one horizontal light filter 30. Each time when the horizontal driving mechanism 4 drives the horizontal light filter group 3, a displacement of one horizontal light filter 30 is moved. When the vertical driving mechanism 6 drives the vertical light filter group 5 to move by a displacement, the vertical light beam correspondingly passes through a vertical light filter 50. The horizontal light filters 30 are perpendicular to the vertical light filters 50 with an included angle of 90 degrees. In this embodiment, three horizontal light filters 30 are provided and each horizontal light filter 30 has a different thickness. Three vertical light filters 50 are provided and each vertical light filter 50 has a different thickness. In this way, there may be nine combinations for adjusting the back focus.

As shown in FIG. 1 to FIG. 5, in this embodiment, the horizontal light filter group 3 is provided with a first rack 31. The horizontal driving mechanism 4 includes a horizontal driving motor 41 and a first deceleration gear group 42 driven by the horizontal driving motor 41 to drive the first rack 31 to reciprocate.

As shown in FIG. 1 to FIG. 5, in this embodiment, the first deceleration gear group 42 includes a first driving tooth 43 disposed on a motor shaft of the horizontal driving motor 41 and a first first-order driven large tooth 44 engaged with the first driving tooth 43. The first first-order driven large tooth 44 is coaxially provided with a first first-order driven small tooth 45. The first first-order driven small tooth 45 is engaged with a first second-order driven large tooth 46. The first second-order driven large tooth 46 is coaxially provided with a first second-order driven small tooth 47. The first second-order driven small tooth 47 is engaged with the first rack 31.

As shown in FIG. 1 to FIG. 5, in this embodiment, the vertical light filter group 5 is provided with a second rack 51. The vertical driving mechanism 6 includes a vertical driving motor 61 and a second deceleration gear group 62 driven by the vertical driving motor 61 to drive the second rack 51 to reciprocate.

As shown in FIG. 1 to FIG. 5, in this embodiment, the second deceleration gear group 62 includes a second driving tooth 63 disposed on a motor shaft of the vertical driving motor 61 and a second first-order driven large tooth 64 engaged with the second driving tooth 63. The second first-order driven large tooth 64 is coaxially provided with a second first-order driven small tooth 65. The second first-order driven small tooth 65 is engaged with a second second-order driven large tooth 66. The second second-order driven large tooth 66 is coaxially provided with a second second-order driven small tooth 67. The second second-order driven small tooth 67 is engaged with the second rack 51.

The horizontal driving mechanism 4 has a same structure as that of the vertical driving mechanism 6. The small tooth drives the large tooth to decelerate, thereby achieving a smooth transmission. A servo motor may be used to cooperate with a PI element to control movement of light filter groups in two directions, so that combination and matching of various light filters can be more accurately controlled.

As shown in FIG. 1 to FIG. 5, in this embodiment, the lens head holder body 2 is provided with a first guide rail 21 and a second guide rail 22 on which the horizontal light filter group 3 can slide. The first guide rail 21 and the second guide rail 22 are located on a same horizontal plane. The lens head holder body 2 is further provided with a third guide rail 23 and a fourth guide rail 24 on which the vertical light filter group 5 can slide. The third rail 23 is disposed right above the fourth guide rail 24.

As shown in FIG. 1 to FIG. 5, in this embodiment, the lens head holder body 2 is provided with a horizontal end face 25 and a vertical end face 26 that is perpendicular to the horizontal end face 25. The horizontal end face 25 is provided with a horizontal light outlet aperture 251 for the horizontal light beam to emit out. The horizontal end face 25 is provided with a horizontal cover plate 27. The horizontal cover plate 27 is provided with a horizontal cover plate aperture 271 covering on the horizontal light outlet aperture 251. The size of an aperture of the horizontal cover plate aperture 271 corresponds to the horizontal light filters 30. The horizontal cover plate aperture 271 ensures that the area of a horizontal light beam only casts on one horizontal light filter 30. The vertical end face 26 is provided with a vertical light outlet aperture 28 for the vertical light beam to emit out. The vertical end face 26 is provided with a vertical cover plate 29. The vertical cover plate 29 is provided with a vertical cover plate aperture 291 covering on the vertical light outlet aperture 28. The size of an aperture of the vertical cover plate aperture 291 corresponds to the vertical light filters 50. The vertical cover plate aperture 291 ensures that the area of a vertical light beam only casts on one vertical light filter 50.

What is claimed is:

1. An optical system, comprising a lens barrel (1), wherein the lens barrel (1) is provided with a lens head holder body (2); a prism used for splitting a light beam into a plurality of light beams is arranged in the lens head holder body (2); and the lens head holder body (2) is provided with a plurality of light filter groups used for allowing the plurality of light beams emitted by the prism to pass through and a driving mechanism capable of driving the light filter groups to reciprocate;

wherein the light filter groups comprise a horizontal light filter group (3) for a horizontal light beam to pass through and a vertical light filter group (5) for a vertical light beam to pass through; the driving mechanism comprises a horizontal driving mechanism (4) that can drive the horizontal light filter group (3) to reciprocate and a vertical driving mechanism (6) that can drive the vertical light filter group (5) to reciprocate; the horizontal light filter group (3) is composed of at least two horizontal light filters (30) with different thicknesses; and the vertical light filter group (5) is composed of at least two vertical light filters (50) with different thicknesses.

2. The optical system according to claim 1, wherein the horizontal light filter group (3) is provided with a first rack (31); the horizontal driving mechanism (4) comprises a horizontal driving motor (41) and a first deceleration gear group (42) driven by the horizontal driving motor (41) to drive the first rack (31) to reciprocate.

3. The optical system according to claim 2, wherein the first deceleration gear group (42) comprises a first driving tooth (43) disposed on a motor shaft of the horizontal driving motor (41) and a first first-order driven large tooth (44) engaged with the first driving tooth (43); the first first-order driven large tooth (44) is coaxially provided with a first first-order driven small tooth (45); the first first-order driven small tooth (45) is engaged with a first second-order driven large tooth (46); the first second-order driven large tooth (46) is coaxially provided with a first second-order driven small tooth (47); and the first second-order driven small tooth (47) is engaged with the first rack (31).

4. The optical system according to claim 2, wherein the vertical light filter group (5) is provided with a second rack (51); the vertical driving mechanism (6) comprises a vertical driving motor (61) and a second deceleration gear group (62) driven by the vertical driving motor (61) to drive the second rack (51) to reciprocate.

5. The optical system according to claim 4, wherein the second deceleration gear group (62) comprises a second driving tooth (63) disposed on a motor shaft of the vertical driving motor (61) and a second first-order driven large tooth (64) engaged with the second driving tooth (63); the second first-order driven large tooth (64) is coaxially provided with a second first-order driven small tooth (65); the second first-order driven small tooth (65) is engaged with a second second-order driven large tooth (66); the second second-order driven large tooth (66) is coaxially provided with a second second-order driven small tooth (67); and the second second-order driven small tooth (67) is engaged with the second rack (51).

6. The optical system according to claim 4, wherein the lens head holder body (2) is provided with a first guide rail (21) and a second guide rail (22) on which the horizontal light filter group (3) can slide; the first guide rail (21) and the second guide rail (22) are located on a same horizontal plane; the lens head holder body (2) is further provided with a third guide rail (23) and a fourth guide rail (24) on which the vertical light filter group (5) can slide; and the third rail (23) is disposed right above the fourth guide rail (24).

7. The optical system according to claim 1, wherein the horizontal light filter group (3) is composed of three horizontal light filters (30) with different thicknesses; and the vertical light filter group (5) is composed of three vertical light filters (50) with different thicknesses.

8. The optical system according to claim 7, wherein the lens head holder body (2) is provided with a horizontal end face (25) and a vertical end face (26) that is perpendicular to the horizontal end face (25); the horizontal end face (25) is provided with a horizontal light outlet aperture (251) for the horizontal light beam to emit out; the horizontal end face (25) is provided with a horizontal cover plate (27); the horizontal cover plate (27) is provided with a horizontal cover plate aperture (271) covering on the horizontal light outlet aperture (251); the size of an aperture of the horizontal cover plate aperture (271) corresponds to the horizontal light filters (30); the vertical end face (26) is provided with a vertical light outlet aperture (28) for the vertical light beam to emit out; the vertical end face (26) is provided with a vertical cover plate (29); the vertical cover plate (29) is provided with a vertical cover plate aperture (291) covering on the vertical light outlet aperture (28); and the size of an aperture of the vertical cover plate aperture (291) corresponds to the vertical light filters (50).

\* \* \* \* \*